United States Patent [19]

Schmitt

[11] 4,399,347
[45] Aug. 16, 1983

[54] DEVICE FOR ATTACHMENT TO MOTOR VEHICLE WINDOWS TO PREVENT FOGGING OR ICING

[75] Inventor: Wilhelm Schmitt, Heppenheim, Fed. Rep. of Germany

[73] Assignee: Firma Carl Freudenberg, Weinheim, Fed. Rep. of Germany

[21] Appl. No.: 258,764

[22] Filed: Apr. 29, 1981

[30] Foreign Application Priority Data

Jun. 28, 1980 [DE] Fed. Rep. of Germany ....... 3024470

[51] Int. Cl.³ .......................... H05B 3/36; B60J 1/20; E06B 7/12
[52] U.S. Cl. .................................. 219/203; 52/171; 98/90; 160/DIG. 2; 160/DIG. 3; 219/345; 219/526; 219/528; 219/536; 219/548; 219/549; 296/84 R; 296/95 C; 296/97 D; 296/97 E
[58] Field of Search ............... 219/345, 202, 203, 528, 219/526, 548, 549, 536; 98/90; 52/171; 296/95 C, 95 Q, 95 R, 97 E, 97 H, 97 R, 84 R, 84 E; 160/DIG. 2, DIG. 3

[56] References Cited

U.S. PATENT DOCUMENTS

| | | | |
|---|---|---|---|
| 1,743,638 | 1/1930 | Tefft | 219/203 X |
| 1,852,599 | 4/1932 | Zaiger et al. | 219/203 |
| 2,735,926 | 2/1956 | Langlois | 219/528 |
| 3,594,547 | 7/1971 | Quinn | 219/203 |
| 3,751,100 | 8/1973 | Keyes | 296/95 C |
| 3,878,362 | 4/1975 | Stinger | 219/549 X |
| 3,880,461 | 4/1975 | Flanagan | 296/95 C |
| 3,900,654 | 8/1975 | Stinger | 219/528 X |
| 4,109,957 | 8/1978 | Polizzi et al. | 296/95 C |
| 4,202,396 | 5/1980 | Levy | 296/97 E |
| 4,203,198 | 5/1980 | Hackett et al. | 219/528 X |

FOREIGN PATENT DOCUMENTS

| | | | |
|---|---|---|---|
| 2704248 | 8/1978 | Fed. Rep. of Germany | 219/528 |
| 765709 | 1/1957 | United Kingdom | 219/528 |
| 1066822 | 4/1967 | United Kingdom | 296/95 C |

*Primary Examiner*—A. Bartis
*Attorney, Agent, or Firm*—Kenyon & Kenyon

[57] ABSTRACT

A flexible device which can be detachably mounted on a window, such as a vehicle window, in order to prevent icing or fogging. The device is a semi-flexible sheet of layered materials having a length and width substantially coterminus with the window and having arranged at intervals along its two dimensions, holders which are used to detachably mount the device on the window. The sheet materials include a rather stiff supporting layer which acts as a backing surface of the sheet and a heat reflecting layer on the sheet side which faces the window when mounted. Optional layers include an insulating layer, a decorative layer, a silicone rubber electrically conductive layer and braided copper electrode strips for connecting the conductive layer to an electric source and causing the generation of heat from the conductive layer. The holders are of a length which will position the sheet a distance of about 5 to 15 mm away from the window. The air in the gap thus created is warmed by heat and light through the window. This process generates a connective warm air flow in the gap which prevents icing of fogging.

11 Claims, 8 Drawing Figures

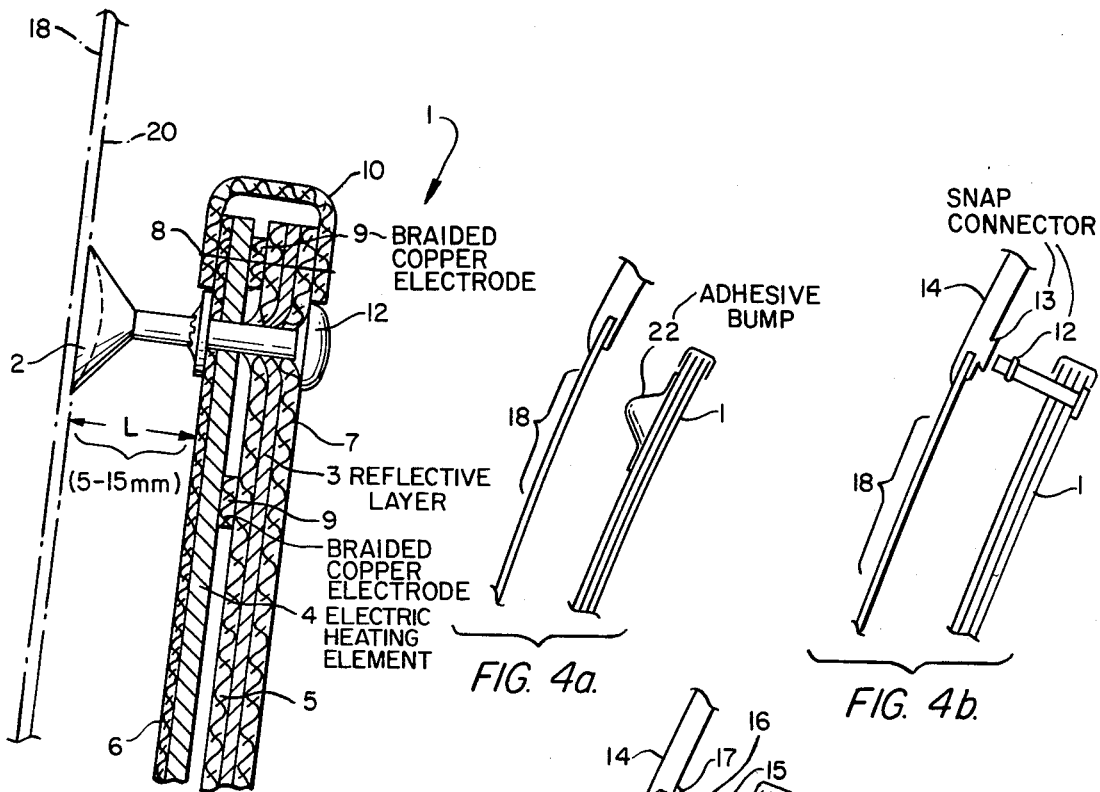
FIG. 3.
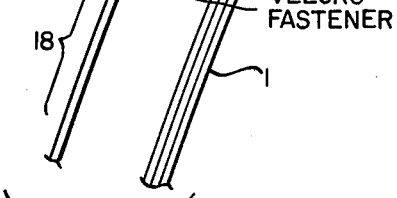
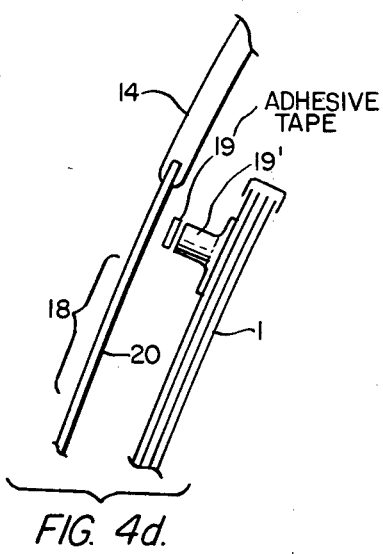
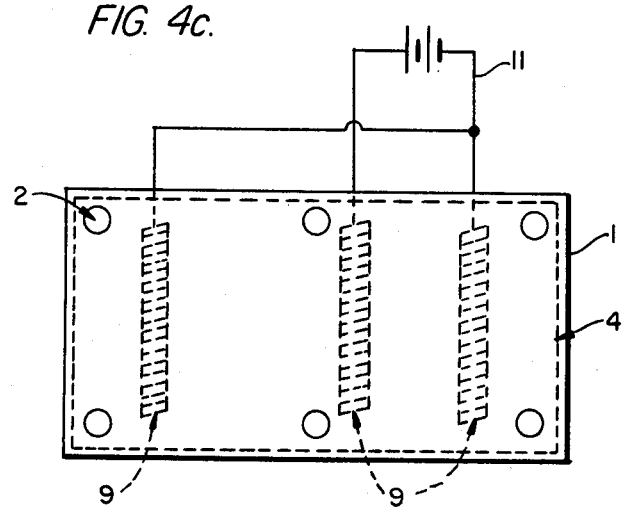

DEVICE FOR ATTACHMENT TO MOTOR VEHICLE WINDOWS TO PREVENT FOGGING OR ICING

BACKGROUND OF THE INVENTION

The invention relates to a device for preventing the formation of fog or icing on a transparent body, for instance, the windshield of a motor vehicle.

A customary method for preventing icing of the windshield of a parked motor vehicle consists of placing a heat-insulating protective foil or a cardboard on the outside and to clamp it by means of the raised windshield wipers. With this method, contamination of the protective foil by the dust and moisture sticking to the windshield cannot be avoided, and it is necessary to renew the material within a short time. If the temperature varies, the protective foil can freeze on, and the windshield will cool down considerably. Upon subsequent heating of the interior, the formation of condensed water on the inside results which can impair the view on the road and cause the traffic safety problems. After use, the dirty foil must furthermore be placed in the motor vehicle which is often troublesome or difficult.

Another method is to heat the windshield directly or indirectly by an electric resistance wire. This, however, requires a large amount of electric energy which necessitates, among other things, oversized batteries. The field of view is also impaired by the firmly anchored resistance wires and is considered as extremely disturbing in most situations.

It is an object of the invention to develop a device of this kind which can be handled easily and cleanly while avoiding the above-mentioned disadvantages, and which is characterized by good efficiency while consuming no, or only an insignificant amount, of electric energy.

SUMMARY OF THE INVENTION

These and other objects are achieved by a device of the invention which comprises a planar structure to which is attached fastening holders. The holders raise the structure a distance of 5 to 15 mm from the inside of the body. The structure has a reflecting layer, facing the body to reflect incident heat radiation penetrating the body.

BRIEF DESCRIPTION OF THE DRAWING

An embodiment of the present invention is depicted in the attached drawings.

FIG. 3 shows a detail from the device according to FIG. 2 in a cross-sectional enlarged view.

FIG 4a shows the device according to FIG. 3 having an adhesive bump (22) substituted for suction cup 2.

FIG. 4b shows the device according to FIG. 3 having an snap connector (12,13) substituted for suction cup (2).

FIG. 4c shows the device according to FIG. 3 having a "velcro" fastener (16,17) substituted for suction cup (2).

FIG. 4d shows the device according to FIG. 3 having adhesive tape (19) substituted for suction cup (2).

FIG. 5 shows a front plane view of the device according to FIG. 2 with the outline of the electrodes (9) within the device.

DETAILED DESCRIPTION OF THE INVENTION

Figure 1:
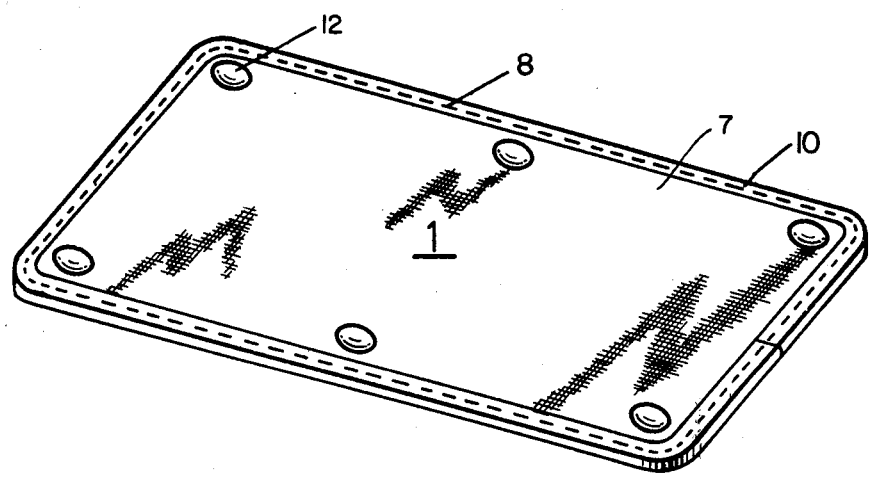
FIG. 1 show the planar structure with the reflecting layer as well as with suction cups.

The high effectiveness of the device of the invention is based in part on the fact that the heat radiation passing through the transparent body from the outside is reflected by the reflecting layer toward the inside of the body, which results in a slight temperature rise of the body and of the air contained in the space between. Through the mutual superposition of the body and air, a heating is obtained in most cases which is sufficient for attaining the desired success. It is believed that convection processes play a decisive part. They are of substantial importance if the gap formed between the transparent body and the device is open at least at the top and bottom, so that air can be drawn-in from the environment and can flow through the gap. By a corresponding arrangement, moisture residue is removed from the windshield in a short time, which improves the defogging operation. This effect can be demonstrated convincingly by a test with smoke.

It is found that the air volume, for instance, heated to a temperature of 25° C. in a stationary passenger car is sufficient when using the proposed device to prevent the icing of the windshield at outside temperatures of −5° and quiet air for a period of five hours.

The planar structure is to be attached to the inside of the body in such a manner that the reflecting layer is raised a distance of 5 to 15 mm therefrom. If the distance is smaller, this results in an impairment of the desired convection processes. If the distance is larger, the degree of heating of the enclosed air and of the windshield is often not quite sufficient under middle-European weather conditions to obtain the desired effect.

Holders can be suction cups, adhesive bumps, snap button fasteners, and/or burr or adhesive tape.

Depending on the flexibility of the device, a varying number of holders may be required for maintaining the desired distance. The smallest possible number is required if the planar structure is made stiff like cardboard. Such a planar structure makes it possible to maintain the desired distance in an optimum manner at all points of curved windshields which thereby achieves optimum utilization of the heat radiation incident on the reflecting layer from the outside. The installation of such a relatively stiff planar structure can be simple and fast and can be facilicated by subdivision into different individual elements.

Accommodating such relatively stiff planar structures, however, can present difficulties if the space is limited. According to the invention, an embodiment is therefore preferred which has flexible properties. The number of holders required must be increased accordingly. The planar structure may consist of a foil, a non-woven fabric or a woven fabric, the last-mentioned materials having increased thermal insulation due to the pore volume contained therein, which has an advantageous effect on the desired effectiveness.

Completely independent of the type of planar structure used in detail is the manner and application of the reflecting layer. The reflecting layer can therefore be completely independent and may, for instance, consist of a reflecting aluminum foil which is combined with a support layer to form the planar structure. Both layers can be cemented or sewn together or joined in another manner.

For a cost-effective method of production, it has been found to be more advantageous if a support layer is used, to which the reflecting layer is applied directly. For example, the layer can be formed by vacuum vapor deposition or by printing or brushing-on a binder containing metallic powder. If a printing process is used, the possibility exists to apply the reflecting layer discontinuously, for instance, in the form of layer sections which are independent of each other or connected to each other. Depending on the respective shape of the individual layer sections and their mutual relation, a directional stiffening effect is obtained. An oblong design can ensure, for example, that the desired distance of the planar structure from the body is maintained and can facilitate, in addition, the folding-up of the planar structure after use.

When using the device under particularly difficult weather conditions, it has been found to be advantageous if the planar structure is provided with a planar heating element on the side facing the body. This heating element may consist of a foil of electrically conductive material with high internal resistance. The current is brought-in by electrodes of alternating polarity, which subdivide the overall area into equally or differently wide strips. A heating element of this type may consist, for instance, of a foil, 0.2 mm thick, of electrically conductive silicone rubber to which electrodes of copper foil, 10 mm wide, are sewn directly at the desired spacings. The degree of heating is a direct consequece of the width of the respective strip. It has been proven to be advantageous to make the strips narrower in the lower region of the planar structure whereby more heating is obtained with the same voltage potential. Such a planar structure can be rolled up particularly easily without the danger that the foil might break at the electrodes.

A heating element of the type discussed above has electric conductivity properties throughout and it is therefore advisable to provide on the side facing the body an additional cover layer and, optionally, on the back side an additional electric insulating layer against the reflecting layer, and to connect all layers to the heating element and the support layer by a single revolving seam and optionally by a binding. The seam can advantageously be a quilting-stich steam. The thread used should have electrically non-conducting properties. The same requirement must be met with respect to the design of the cover layer and the insulating layer. Preferably foils or non-woven fabrics of synthetic materials, for instance, of polyolefin or a polyester are preferably used for this purpose.

The embodiment of the invention depicted by the drawings will be described in greater detail.

The planar structure 1 according to FIG. 1 is designed of several layers, the individual layers being connected together by a binding 10 and a quilting-sitch seam 8. The quilting-stitch seam is made on a sewing machine, a sewing thread of polyester being used. The front as well as the back side are covered by decorative fabric with a colored pattern. On the front, suction cups 2 are arranged with such a height and such mutual spacing that the planar structure, after installation on the inside of an inclined windshield has a distance of 5 to 15 mm from the latter.

Figure 2:
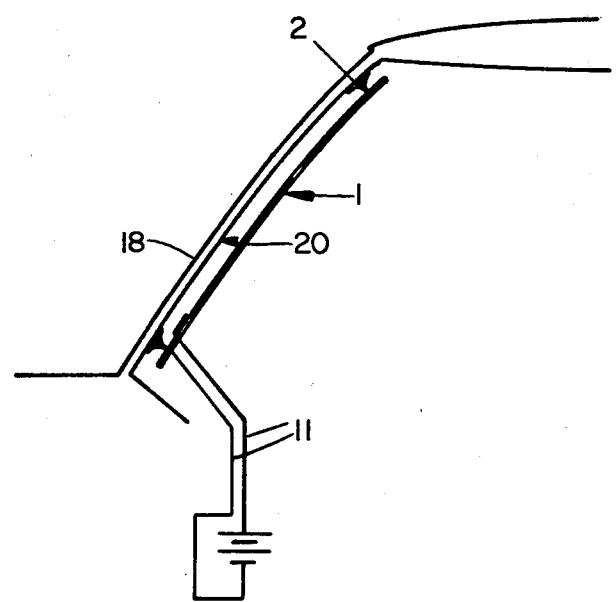
FIG. 2 shows an example of an installation situation on the windshield of a motor vehicle.

FIG. 2 illustrates an electrically heating installation with the electric feed wire being designated 11. Planar structure 1 and holders 2 in the form of suction cups are shown detachably mounted to the inside surface 20 of windshield 18.

FIG. 3 shows the several layers of planar structure 1. Suction cup 2 holds structure 1 at a distance L of about 5 to 15 mm from windshield 18. In the vicinity of the back side, a support layer 7 is arranged, consisting of a non-woven fabric with an area weight of 150 g/m$^2$ of polyester fibers cemented together by means of a cross-linked binder, with a staple length of 40 mm and a strength of 18.9 denier. The fibers are preferably oriented in the direction connecting the long sides of the planar structure. This imparts a directional stiffening ability to the planar structure. It can readily be wound up and folded in the crosswise direction without subsequently showing creases.

The support layer 7 has on the front side a continuous coating 3 of a binder with aluminum powder uniformly embedded therein. The binder content of the coating is 20% by weight. The coating has an area weight of 80 g/m$^2$ and is distinguished by a mirror-like surface gloss. In a comparison test a similar support layer was laminated with an aluminum foil on the front side. The reflectivity for incident heat rays obtained was somewhat better, but the textile properties of the support layer were distinctly poorer than the coated structure.

The reflecting layer 3 is covered on the front side with an insulating layer 5 of non-woven fabric. The internal structure of the non-woven fabric corresponds to the composition given above. The area weight is 60 g/m$^2$.

The insulating layer 5 is covered on the front side by the large-area heating element 4 of a foil, 0.2 mm thick, of an electrically conductive silicone rubber. On the back side of the foil, braided copper strips 9 which have a width of 10 mm and a thickness of 0.1 mm are sewed on parallel to the long edges at a mutual distance of 110 mm. The copper braid is alternatingly connected with a + and a − pole of the electric cable. After the necessary operating voltage is applied, the large-area heating element 4 warms up uniformly.

On the front side of the heating element, the cover layer 6 of decorative fabric is arranged. This consists of a nonwoven fabric of the composition given above with an area weight of 100 g/m$^2$, and it is printed with a suitable pastel decoration pattern like the support layer 7. The edge of the planar structure is edged with a binding 10 and this as well as all previously mentioned layers are joined together by a single quilting-stitch seam 8.

Within the seam 8, the layers are lying on top of each other more or less loosely, and the resulting gap spacings of slight width contribute substantially to the improvement of the thermal insulation capability. The non-woven fabric layers 5, 6 and 7 have a pore volume of about 90%. As compared to the use of pore-free foils, a substantial improvement of the effectiveness is obtained.

The planar structure 1 is perforated in the vicinity of the edge at uniform spacings of about 300 mm. The openings have a diameter of 5 mm and serve to receive plastic anchors 12, to the front side of which suction cups 2 are fastened. The suction cups have a shank height of 8 mm, which makes it easy to fasten the planar structure at the prescribed distance from the inside of the transparent body. The planar structure overall has flexible properties. In use, it is thereby easy to remove it from the body and fold it up into a small size. The device will then conveniently fit in the space available in the glove compartment of the customary passenger car.

FIGS. 4a-4d shows an enlarged cross-sectional view of the device as shown in FIG. 3 but with other types of holders substituted for the suction cup 2. The planar structure 1 is shown in outline form. FIG. 4a shows an adhesive bump 22 protruding from planar structure 1. The adhesive is coated on the surface of bump 11. FIG. 4b shows a snap button connector 12 with its corresponding receptacle 13 along the windshield frame 14. FIG. 4c shows a burr 15 protrusion such as a "velcro" strip 16 with its corresponding attachment 17 along the windshield frame 14. FIG. 4d shows an adhesive tape 19 and protrusion 19 which would stick directly to the inside surface 20 of the windshield 18.

FIG. 5 shows a front plane view of the device of FIG. 3. The copper braided electrodes 9 are shown in outline form and divide element 4 into even and uneven sections.

What is claimed is:

1. In combination with a transparent body having an outer surface exposed to ambient atmosphere and an inner surface exposed to a confined atmosphere; a device for preventing icing or fogging, comprising:
    a planar structure having front and back sides, a layer of reflecting material on said front side, and a length and width coterminus with said body, said front side facing said inner surface; and
    holders affixed to said structure, extending outward from said front side at a distance of from about 5 to 15 mm, and detachably mounted upon said inner surface of said body so as to position said structure and said inner surface essentially parallel, overlapping and at a distance of from about 5 to 15 mm apart to create a convective flow space therebetween; thereby preventing moisture or ice deposit on said body.

2. A device for preventing the formation of fog or ice on a transparent body having an outside surface exposed to ambient atmosphere and an inside surface exposed to a confined atmosphere, which comprises:
    a planar structure having a front side, a back side, and a layer of reflecting material on said front side; and holders affixed to said structure, extending outward a distance of from about 5 to 15 mm from said front side; said holders being adapted to position said structure adjacent transparent body with said front side facing the inside surface of the transparent body and with said structure and the inside surface of the body being essentially parallel, overlapping and at a distance of from about 5 to 15 mm apart to create a convective air flow space therebetween.

3. A device according to claim 1 or 2 wherein said holders are selected from the group consisting of suction cups, adhesive bumps, snap button connectors, burrs and adhesive tape.

4. A device according to claim 1 or 2 wherein said planar structure comprises a flexible support sheet coated with a reflecting layer comprising a mixture of a binder and a finely distributed metallic powder to form said reflecting layer.

5. A device according to claim 4 wherein said support sheet is selected from the group consisting of woven and nonwoven material.

6. A device according to claim 1 or 2 wherein said planar structure comprises a flexible support sheet to which is bonded as said reflecting layer, an integral sheet of reflecting foil.

7. A device according to claim 1 or 2 wherein said planar structure comprises in layered arrangement from the back to front sides, a flexible support sheet, a layer of reflecting material and a heating element sheet.

8. A device according to claim 7 wherein said heating element sheet comprises a foil of an electrically conductive material with high internal resistance, the overall surface of which is subdivided into strips by electrodes of alternating polarity.

9. A device according to claim 8 wherein the material comprises an electrically conductive silicone rubber.

10. A device according to claim 7 wherein said planar structure further comprises a layer of covering material as a front side layer on said heating element sheet.

11. A device according to claim 10 wherein said planar structure further comprises a layer of insulating material between said heating element sheet and said reflecting layer.

* * * * *